United States Patent [19]

Morello et al.

[11] 4,307,058

[45] Dec. 22, 1981

[54] FORMING A SELECTIVELY DECORATED MOLDED RESIN PANEL

[75] Inventors: Edward B. Morello, Lapeer; Gail Fuller, Vassar, both of Mich.

[73] Assignee: Voplex Corporation, Pittsford, N.Y.

[21] Appl. No.: 151,402

[22] Filed: May 19, 1980

[51] Int. Cl.³ .................. B29D 3/00; B29D 9/10; B29F 1/10

[52] U.S. Cl. .................. 264/510; 264/509; 264/129; 264/132; 264/247

[58] Field of Search .............. 264/510, 511, 513, 129, 264/132, 246, 247, 153, 509; 427/272, 282

[56] References Cited

U.S. PATENT DOCUMENTS

| | | | |
|---|---|---|---|
| 1,776,955 | 9/1930 | Sheras | 264/132 |
| 2,811,744 | 11/1957 | Baldanza | 264/247 X |
| 3,122,598 | 2/1964 | Berger | 264/132 X |
| 3,502,760 | 3/1970 | Ono | 264/247 X |
| 3,537,874 | 11/1970 | Ramey | 427/272 X |
| 3,654,062 | 4/1972 | Loew | 264/247 X |
| 3,839,129 | 10/1974 | Neumann | 264/247 X |

FOREIGN PATENT DOCUMENTS

| | | | |
|---|---|---|---|
| 51-96849 | 2/1975 | Japan | 264/511 |
| 54-134762 | 10/1979 | Japan | 264/246 |
| 764700 | 1/1957 | United Kingdom | 264/129 |

*Primary Examiner*—Jan H. Silbaugh
*Attorney, Agent, or Firm*—Stonebraker, Shepard & Stephens

[57] ABSTRACT

A method for forming and selectively decorating a molded resin panel 10 begins with vacuum forming an applique 15 of decorative resin material and fitting applique 15 in an injection molding cavity. Base 11 is then injection molded to applique 15, and a mask 20 is formed to fit over applique 15. A decorative coating 18 is applied over the panel regions not covered by the mask. A resin undercoating 17 is applied under decorative coating 18 which is covered with a top coating 19 of clear resin material.

5 Claims, 3 Drawing Figures

U.S. Patent  Dec. 22, 1981  4,307,058
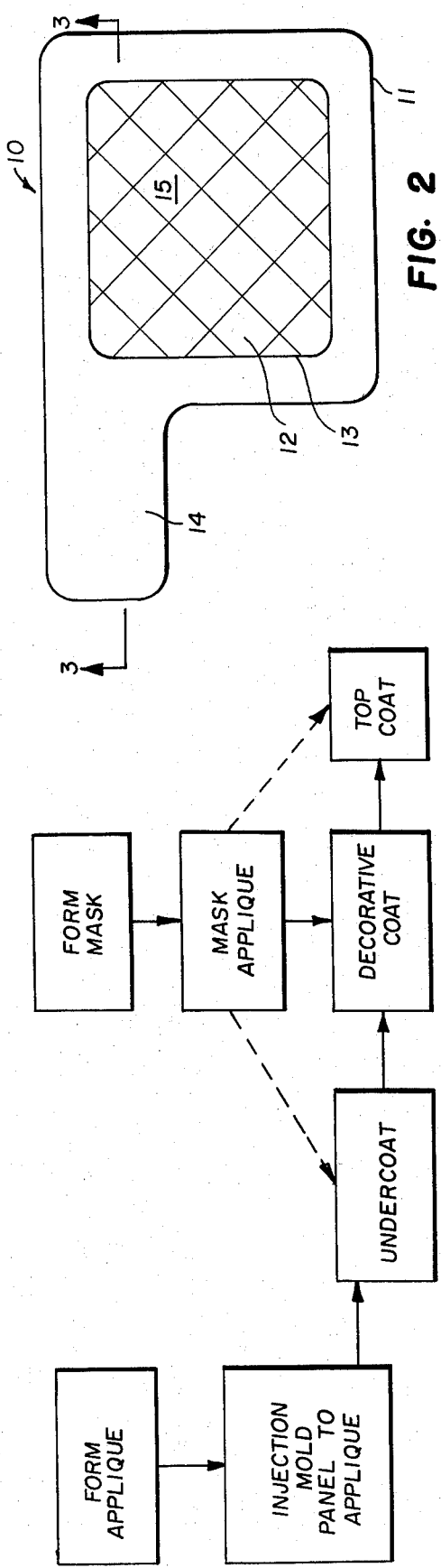
FIG. 2
FIG. 1
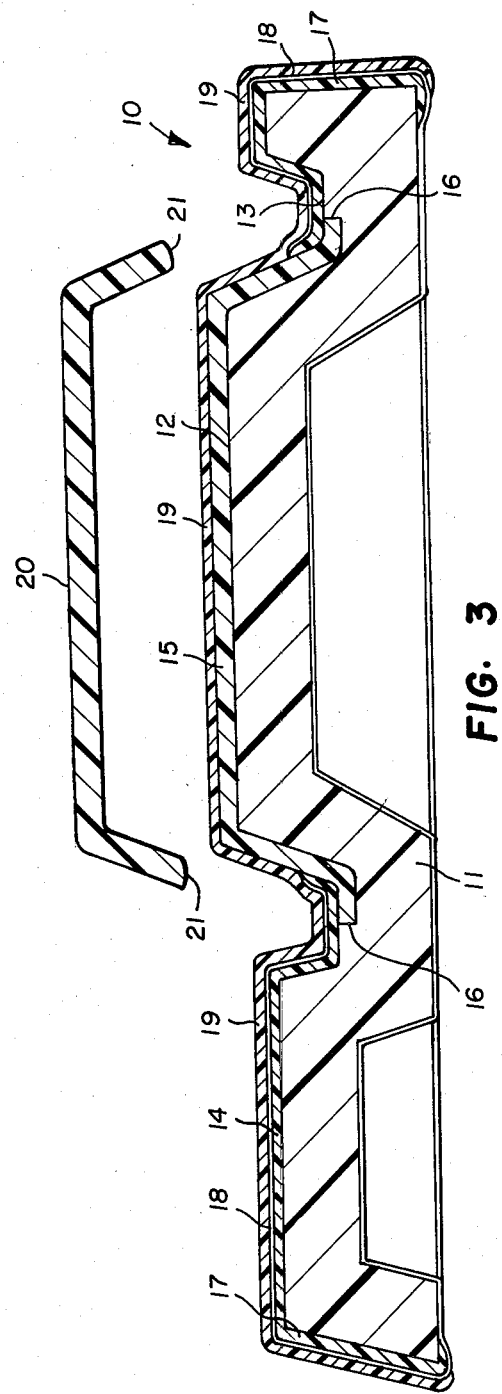
FIG. 3

FORMING A SELECTIVELY DECORATED MOLDED RESIN PANEL

BACKGROUND

The automotive industry demands selectively decorated resin panels having an applique in one region and a contrasting decor in another region. Such panels are used on dashboards and doors but can also be used elsewhere. A typical panel for automotive purposes has a bright metal border and a contrasting region formed as a wood grain, printed pattern, simulated suede, or other decoration. Variations on this can include stripes, beadings, several contrasting regions, raised and lowered regions, recesses or ridges between regions, and other alternatives. The invention can produce a wide variety of panels of this type and is not limited to any particular decoration or end use.

Automotive panels have been made previously by molding resin to form the basic panel shape, undercoating the panel with a clear resin providing a smooth and receptive surface, vacuum metallizing this surface with a metallized layer, covering the metal layer with a clear resin top coat, and then adhering a contrasting applique over the top coat in another region of the panel. The adhesive is expensive; and the edges of the applique tend to work loose, marring the appearance.

The invention provides more efficient methods for selectively decorating molded resin panels and also achieves a more attractive and durable result. It eliminates adhesive; protects the edges of the applique; and for most appliques, uses the top coat protecting the metallized layer to also protect the applique.

SUMMARY OF THE INVENTION

Preferred steps of our inventive method begin with vacuum forming an applique of decorative resin material and fitting the applique in an injection molding cavity. Then we injection mold a panel to the applique and form a mask that fits over the applique. We apply a decorative coating over regions of the panel not covered by the mask, and we precede the decorative coating with an undercoating of resin material under the decorative coating and follow the decorative coating with a top coating of clear resin material over the decorative coating.

DRAWINGS

FIG. 1 is a schematic diagram of preferred steps in our inventive method;

FIG. 2 is a plan view of an illustrative panel made according to our invention; and FIG. 3 is a partially exploded cross-sectional view of the panel of FIG. 2 taken along the line 3—3 thereof.

DETAILED DESCRIPTION

The preferred steps of our invention produce a panel 10 that is selectively decorated with an applique 15 in one region 12 and a contrasting coating in another region 14. The applique region 12 and one or more contrasting regions 14 can be arranged at different levels, given different contours, and used for many different decorative effects. A recess 13 around applique region 12 between applique 15 and contrasting region 14 is useful as explained below, but is not required. The resulting panels can have many different shapes, decorations, and end uses.

We combine applique 15 with base or support 11 in a secure fusion bond accomplished by molding base 11 directly to applique 15. The preferred way of accomplishing this is by vacuum forming an applique of decorative resin material and die cutting the vacuum formed applique to the desired shape to fit the applique in an injection molding cavity where it is held securely in place during injection molding. We then injection mold panel 11 directly to the formed applique within the injection molding cavity that shapes base 11. Applique 15 can have many different configurations that cooperate with an injection molding cavity to hold applique 15 securely in a desired position within the mold cavity during injection molding.

An undercoating 17 must be applied to the panel surfaces to form a smooth and receptive surface for a decorative coat 18 providing a contrasting decoration. The decorative coat 18 is preferably sprayed or vacuum deposited in place and is usually formed as a metallic layer; and to prevent the decorative coating from encroaching on applique 15, we form a mask 20 and fit the mask over applique 15 before applying the decorative coating.

If the material of applique 15 permits, we form undercoat 17 of clear resin material and apply it over the applique and over the entire front surface of panel 10 to help protect and secure the applique in place. This also eliminates the need for any mask as the undercoat is applied, and undercoat 17 can be spray or flow coated.

The mask is required to prevent the spray or vacuum deposited decorative coat 18 from encroaching on applique 15; but if materials permit, we remove mask 20 after completing the decorative coating and extend the protective top coat 19 of clear resin over applique 15 as well as over decorative coat 18. If this is not possible because of incompatible materials, we leave the mask in place as we apply top coat 19, preferably by spray or flow coating.

Mask 20 fits over and around decorative applique 15 and can have its edges 21 conveniently disposed in recess 13 between applique 15 and contrasting region 14. Mask 20 protects decorative applique 15 during application of decorative coating 18 and can also protect applique 15 from undercoating 17 and top coating 19 if necessary. We prefer whenever possible to form both undercoat 17 and top coat 19 of clear resin material and extend these coats over applique 15 for better protection. Although recess 13 is not essential to masking applique 15, it is preferred for helping to retain mask 20 in place and for concealing the mask line.

Our process eliminates adhesives; provides edge security for the applique; and for many applique materials, allows at least one protective clear resin coating providing a good-looking appearance and a long and durable wear life.

We claim:

1. A method of forming and selectively decorating a molded resin panel, said method comprising:
   a. vacuum forming an applique of decorative resin material;
   b. die cutting said applique to form a predetermined peripheral edge;
   c. fitting said applique in an injection molding cavity;
   d. injection molding said panel to said applique so said panel extends beyond said applique and has a recess in the region of said edge of said applique;
   e. forming a mask to fit over said applique;

f. fitting said mask over said applique so a periphery of said mask is disposed in said recess;

g. applying a decorative coating over regions of said panel not covered by said mask; and h. preceding said decorative coating with an undercoating of resin material under said decorative coating and following said decorative coating with a top coating of clear resin material over said decorative coating.

2. The method of claim 1 including removing said mask and applying said top coating to extend over said applique.

3. The method of claim 1 including applying said undercoating of clear resin material before fitting said mask so said undercoating extends over said applique.

4. The method of claim 3 including removing said mask and applying said top coating to extend over said applique.

5. The method of claim 1 including forming said decorative coating as a metallized layer.

* * * * *